United States Patent [19]

Vinson et al.

[11] Patent Number: 4,997,487

[45] Date of Patent: Mar. 5, 1991

[54] HIGH TEMPERATURE SET RETARDED WELL CEMENT COMPOSITIONS AND METHODS

[75] Inventors: Edward F. Vinson, Duncan; Lance E. Brothers, Ninnekah; Daniel L. Bour, Duncan, all of Okla.

[73] Assignee: Halliburton Company, Duncan, Okla.

[21] Appl. No.: 490,025

[22] Filed: Mar. 7, 1990

[51] Int. Cl.$^5$ ............................................. C04B 24/10
[52] U.S. Cl. ................................... 106/804; 106/725; 106/730; 106/805; 106/809; 166/292; 166/293; 166/294; 166/295; 52/744; 405/266; 405/267
[58] Field of Search ................. 52/744; 166/292, 293, 166/294, 295; 405/266, 267; 106/90, 92, 315

[56] References Cited

U.S. PATENT DOCUMENTS

| | | | |
|---|---|---|---|
| 2,006,426 | 7/1935 | Weiler | 106/92 |
| 3,208,524 | 9/1965 | Horner et al. | 166/294 |
| 3,615,794 | 10/1971 | Nimerick | 166/293 |
| 3,740,360 | 6/1973 | Nimerick | 166/295 |
| 3,763,934 | 10/1973 | Coulter, Jr., et al. | 166/294 |
| 3,766,984 | 10/1973 | Nimerick | 166/295 |
| 4,378,049 | 3/1983 | Hsu et al. | 166/294 |
| 4,572,295 | 2/1986 | Walley | 166/294 |
| 4,742,094 | 5/1988 | Brothers et al. | 166/293 |
| 4,766,959 | 8/1988 | Allison | 166/294 |
| 4,806,164 | 2/1989 | Brothers | 166/294 |

*Primary Examiner*—William R. Dixon, Jr.
*Assistant Examiner*—Anthony J. Green
*Attorney, Agent, or Firm*—Robert A. Kent; Thomas R. Weaver

[57] ABSTRACT

Set retarded cement compositions which are substantially non-thinning at high temperatures are provided. The compositions are comprised of hydraulic cement, sufficient water to form a pumpable slurry, a set retarder and a galactomannan gum which has been treated with a hydrophobing agent whereby the hydration rate of the gum is retarded at temperatures below about 120° F. and at pH levels above about 10. The delayed hydration of the treated gum offsets the thinning of the cement compositions at temperatures above about 120° F. Methods of cementing subterranean zones penetrated by well bores utilizing the cement compositions are also provided.

18 Claims, No Drawings

HIGH TEMPERATURE SET RETARDED WELL CEMENT COMPOSITIONS AND METHODS

BACKGROUND OF THE INVENTION

1. Field of the Invention

This invention relates generally to high temperature set retarded well cement compositions and methods, and more particularly, to set retarded cement compositions which are substantially non-thinning at high temperatures and methods of cementing with such compositions.

2. Description of the Prior Art

In cementing operations carried out in oil, gas geothermal and water wells, a hydraulic cement is normally mixed with sufficient water to form a pumpable slurry, and the slurry is pumped into a subterranean zone to be cemented by way of a well bore penetrating the zone. After placement, the cement slurry sets into a hard mass.

In primary cementing whereby casing and/or liners are bonded within the well bore to the subterranean zones penetrated thereby, cementing is accomplished by introducing a cement composition into the annular space between the casing or liner and the well bore. Generally, the cement composition is pumped downwardly within the casing or liner to the bottom thereof and then upwardly into the annulus.

One or more of the zones adjacent the cemented annulus can, and often do, contain fluids under pressure. In order to prevent such pressurized fluids from entering and flowing through the cement composition containing annulus, the cement composition density is increased by including a weighting material such as hematite therein. Fluid loss reducing and other additives are also commonly used in well cement compositions.

Another problems often encountered in well cementing relates to the rate at which the cement composition develops gel and compressive strengths after being placed. In order to allow enough time to mix the cement composition on the surface and then pump it down the well bore and into a desired location therein, a variety of set retarding additives have been utilized. While set retarding additives successfully extend the pumping time between mixing and setting of cement compositions, they are temperature sensitive, i.e., the higher the temperature which a cement composition including such an additive will be exposed to, the greater the quantity of additive required. A problem which arises in the cementing of deep high temperature wells wherein the cement composition must contain relatively high quantities of set retarding additive is that excessive thinning of the cement composition often takes place. Such thinning leads to the settling of solids in the cement composition and the separation of free water therefrom which can bring about undesirable consequences, e.g., bridging, water pockets within the cement column, poor bonding, etc. In deviated wells and geothermal wells, free water can be responsible for fluid migration to other formations, gas leakage and collapsed pipe.

Prior attempts to solve high temperature thinning of set retarded cement compositions have included combining conventional viscosifying agents such as substituted celluloses or bentonite with the compositions. Generally, however, the use of such viscosifying agents results in high surface viscosities which in turn makes mixing and pumping difficult, time consuming and expensive.

By the present invention, improved set retarded well cement compositions for cementing deep hot wells and methods of using such compositions are provided. The set retarded cement compositions are substantially non-thinning at high temperatures while having normal surface viscosities and other properties.

SUMMARY OF THE INVENTION

Set retarded cement compositions which are substantially non-thinning at high temperatures and methods of using such compositions for cementing wells are provided. The compositions are basically comprised of hydraulic cement, sufficient water to form a pumpable slurry, a set retarder and a galactomannan gum which has been treated with a hydrophobing agent. The treatment of he gum with a hydrophobing agent retards the hydration rate of he gum at temperatures below about 120° F. and at pH levels above about 10. When the temperature increases to above about 120° F. and higher, the rate of hydration of the gum also increases thereby offsetting the thinning of the cement composition brought about by high temperatures, i.e., temperatures above about 120° F.

The galactomannan gum is preferably selected from the group consisting of guar gum, hydroxyethylguar gum, hydroxypropylguar gum, carboxymethylhydroxypropylguar gum and carboxyethylhydroxypropylguar gum. The gums are preferably treated with a hydrophobing agent selected from the group consisting of potassium pyroantimonate and compounds capable of liberating borate ions when added to water.

The set retarder in the composition is preferably comprised of a polymer of 2-acrylamido, 2-methylprpane sulfonic acid (AMPS) and acrylic acid having an average molecular weight below about 5000 in combination with sodium tartrate. Such set retarder is effective at high temperature and allows the cement composition to rapidly develop gel strength and compressive strength after placement. The set retarder also may comprise substantially any of the conventionally known retarders such as lignosulfonates, borates, organic acids and the like.

The compositions can also include one or more fluid loss additives therein as well as other conventional additives.

DESCRIPTION OF THE PREFERRED EMBODIMENTS

The cement compositions of the present invention are pumpable aqueous set retarded hydraulic cement slurries comprised of components which make the compositions substantially non-thinning at high temperatures. After placement in a subterranean zone to be cemented by way of a deep hot well bore penetrating the zone, the cement compositions rapidly develop high gel strength followed by rapid compressive strength development. The rapid development of high gel strength prevents pressurized fluid invasion into the zones containing the cement compositions and the substantial non-thinning of the cement compositions prevents excessive settling of solids and separation of free water after placement of the compositions.

While various hydraulic cements can be utilized in forming the compositions, Portland Cement is preferred and can be, for example, one or more of the various Portland Cements identified as API Classes A–H & J Cements. These cements are identified and defined int eh Specifications For Materials And Testing For Well Cements, API Specification 10, 4th Edition, Aug. 1, 1988, of the American Petroleum Institute which is incorporated herein by reference.

The thickening and initial set times of cement compositions are strongly dependent upon temperature and pressure. To obtain optimum results in oil, gas and water well applications, a variety of additives are often included in cement compositions to vary their density, increase or decrease strength, accelerate or retard thickening time, control fluid loss, increase resistance to corrosive fluids, etc. Essentially, a cement meeting the specifications of the American Petroleum Institute is mixed with water and other additives to provide a cement composition appropriate for the conditions existing in each individual well to be cemented.

In accordance with the present invention, set retarded well cement compositions for cementing high temperature wells are provided which develop high gel strength in relatively short time periods after placement followed by rapid compressive strength development, and which are substantially non-thinning at the high temperatures encountered. The term "high temperature(s)" is used herein to means temperatures in the range of from about 120° F. to about 500° F.

The cement compositions of the present invention are comprised of hydraulic cement, sufficient water to form a pumpable slurry, a set retarder, and a galactomannan gum which as been treated with a hydrophobing agent whereby the hydration rate of the gum is retarded at temperatures below about 120° F. and at pH levels above about 10. Other desired conventional additives such as fillers, e.g., silica flour, weighting materials, dispersing agents, fluid loss additives, etc. can also be included in the cement compositions.

The water used, preferably fresh water, is generally present in the cement compositions in an amount of from about 30% to about 60% by weight of the dry hydraulic cement utilized. However, as will be understood, the particular quantity of water utilized can vary appreciably from the aforesaid amounts, and various oil field and other waters other than fresh water can be utilized.

Galactomannan gums which are useful in accordance with the present invention are those naturally occurring polysaccharides which are primarily composed of D-mannose and D-galactose units. The gums are soluble, i.e., the gums hydrate in water. Galactomannan gums are derived from various endosperms of seeds, and examples are tara, locust bean, guar, ploverde, honey locust, Japanese pagoda, prairie mimosa, indigo, lucerne, etc. The gums are generally provided by the manufacturers thereof in solid particulate form.

Preferred galactomannan gums for use in accordance with the present invention are guar gum and the hydroxyalkylether derivatives of guar gum. The most preferred such gums are those selected from the group consisting of guar gum, hydroxyethylguar gum, hydroxypropylguar gum, carboxymethylhydroxypropylguar gum and carboxyethylhydroxypropylguar gum.

When a galactomannan gum is treated with a hydrophobing agent, the natural hydrophillic properties of the gum are inhibited sufficiently to allow the gum to be dispersed in an aqueous carrier liquid having a temperature below about 120° F. and a pH of about 10 or greater. The hydration rate of a dispersed hydrophobing agent treated galactomannan gum is substantially retarded in an aqueous hydraulic cement composition until the temperature of the composition increases to above about 120° F.

The hydrophobing agent can be any material capable of temporarily inhibiting the natural hydrophillic property of a galactomannan gum. Examples of such hydrophobing agents which can be utilized to treat galactomannan gums and substantially retard the hydration rates thereof at temperatures below about 120° F. and at pH levels above about 10 are potassium pyroantimonate and compounds capable of liberating borate ions when added to water. Suitable borate liberating compounds are alkali metal borates, sodium tetraborate (borax), sodium perborate and sodium metaborate.

The degree of retardation i.e., the slowness of the hydration rate of the hydrophobing agent treated galactomannan gum depends on the extent of the treatment. The treatment is carried out by reacting the gum in an aqueous solution containing the hydrophobing agent used. When potassium pyroantimonate is utilized as the hydrophobing agent, its concentration can be varied from about 0.001% to about 0.3% based on the weight of the galactomannan gum treated. Increasing the quantity of the potassium pyroantimonate used in the reaction increases the degree of retardation. For example, and as described in detail in U.S. Pat. No. 4,378,049 issued Mar. 29, 1983 which is incorporated herein by reference, when hydroxypropylguar gum is reacted with potassium pyroantimonate in a quantity of 0.02% by weight of the gum, the hydration of the gum in an aqueous solution having a pH above about 10 is rapid at a temperature in the range of from about 150° F. to about 175° F. When the gum is reacted with a 0.2% quantity of potassium pyroantimonate by weight of the gum, the hydration of the gum is not rapid until a temperature in the range of from about 300° F. to about 325° F. is reached.

When a compound capable of liberating borate ions when added to water is utilized, from about 0.5% to about 1% of the compound based on the weight of galactomannan gum treated is generally sufficient to substantially retard the hydration rate of the gum in an aqueous hydraulic cement composition until the composition reaches a temperature of about 120° F.

A set retarded cement composition of this invention which is substantially non-thinning at high temperatures is comprised of hydraulic cement, preferably API class H Portland Cement, sufficient water to form a pumpable slurry, a set retarder and a galactomannan gum which has been treated with a hydrophobing agent whereby the hydration rate of the gum is retarded at temperatures below about 120° F. and at pH levels above about 10, but the hydration rate increases at temperatures above about 120° F., the treated gum being present in the composition in an amount sufficient to offset the thinning of the composition at temperatures above about 120° F. by the hydration of the gum. As mentioned above, the cement composition preferably includes a treated galactomannan gum selected from the group consisting of hydroxyethylguar gum, hydroxypropylguar gum, carboxymethylhydroxypropylguar gum and carboxyethylhydroxypropylguar gum. The gum is preferably treated with a hydrophobing agent selected form the group consisting of potassium pyroantimonate and compounds capable of liberating borate ions when added to water, and the treated gum is preferably present in the cement composition in an amount in the range of from about 0.05% to about 2.0% by weight of dry hydraulic cement in the composition. A particularly preferred such composition includes a borate treated hydroxypropylguar gum present in the composition in an amount in the range of from about 0.2% to about 1.0% by weight of dry hydraulic cement in the composition.

While various set retarders can be utilized in the cement compositions of this invention, a preferred set retarder which allows rapid development of cement compressive strength after placement is comprised of a copolymer of 2-acrylamido, 2-methylpropane sulfonic acid (referred to herein as AMPS, a registered trademark of the Lubrizol Corp.) and acrylic acid. The copolymer comprises from about 40 to about 60 mole percent AMPS with the balance comprising acrylic acid. The set retarding copolymer preferably has an average molecular weight below about 5000 such that a 10% aqueous solution of the copolymer has a Brookfield Viscosity Reading at 20 rpm of the U.L. adapter spindle in the range of from about 2 to less than 5 centipoise. As used herein, the phrase "average molecular weight" means a weight average molecular weight such as may be determined by gel permeation chromatography. Preferably, the copolymer comprises from about 45 to about 55 mole percent AMPS, and most preferably, about 50 mole percent AMPS. The set retarding copolymer of AMPS and acrylic acid is preferably present in a cement composition of this invention in an amount in the range of from about 0.1% to about 5.0% by weight of hydraulic cement, most preferably from about 0.5% to about 2.0% by weight of hydraulic cement. When the above described AMPS—acrylic acid copolymer is utilized in the cement compositions of this invention within the range of amounts given above, the cement compositions are sufficiently retarded to be placed in deep hot wells, and once placed, the cement compositions rapidly develop gel strength followed by the rapid development of compressive strength.

In order to enhance the set retarding ability of the AMPS—acrylic acid copolymer at high temperatures, the cement compositions also preferably include sodium tartrate in an amount in the range of from about 0.1% to about 3.0% by weight of hydraulic cement in the compositions, most preferably about 0.25% to about 2.0% by weight of hydraulic cement. As will be understood, tartaric acid or other salts of tartaric acid can be combined with the cement compositions in place of the sodium tartrate.

When conventional retarders, e.g., lignosulfonates, borates or organic acids such as gluconic acid, citric acid and the like are used in lieu of the preferred AMPS—acrylic acid copolymer described above, they are preferably used in amounts ranging as follows:

| Set Retarder | Amount, % by wt. of cement |
| --- | --- |
| lignosulfonates | 0.1 to 5.0 |
| borates | 0.2 to 5.0 |
| organic acids | 0.2 to 5.0 |

If tartaric acid or salts thereof are used with the above set retarders, the acid or salts are preferably used in amounts in the range of from about 0.2% to about 5.0% by weight of cement used.

The set retarded cement compositions of the present invention also preferably include at least one fluid loss reducing additive. While a variety of fluid loss reducing additives can be utilized to insure low fluid loss, a fluid loss reducing complex comprised of the reaction product of polyethyleneimine having a molecular weight above about 50,000 and a sulfonated organic compound is preferred. The sulfonated organic compound is selected from the group consisting of lignosulfonic acid salts having Na, Ca, or NH$_4$ as the associated cation, naphthalene sulfonic acid condensed with formaldehyde having a molecular weight above about 5000, and mixtures of such compounds. A liquid fluid loss reducing additive containing the above described complex is comprised of water, a base, a polyethyleneimine and a sulfonated organic compound. The above described fluid loss reducing additive is described in detail in U.S. Pat. No. 4,742,094 issued May 3, 1988 which is incorporated herein by reference. The liquid fluid loss reducing additive is referred to hereinafter as an aqueous solution of the reaction product of polyethyleneimine and one or more sulfonated organic compounds. When used in a composition of the present invention, the liquid fluid loss reducing additive is preferably present therein in an amount in the range of from about 2.5% to about 10.0% by weight of hydraulic cement in the composition, most preferably about 5.0% by weight of hydraulic cement.

A particularly preferred set retarded cement composition of the present invention which is substantially non-thinning at high temperatures is comprised of hydraulic cement, preferably API class H Portland Cement; sufficient fresh water to form a pumpable slurry; a set retarder comprised of a copolymer of AMPS and acrylic acid having an average molecular weight below about 5000 and comprising from about 40 to about 60 mole percent AMPS present in an amount in the range of from about 0.2% to about 3.0% by weight of hydraulic cement in said composition, and sodium tartrate present in an amount in the range of from about 0.1% to about 1.5% by weight of hydraulic cement in said composition; a fluid loss additive comprised of an aqueous solution of the reaction product of polyethyleneimine and one or more sulfonated organic compounds present in said composition in an amount in the range of from about 2.5% to about 10.0% by weight of hydraulic cement in the composition; and a borate treated hydroxypropylguar gum having a retarded hydration rate at temperatures below about 120° F. and at pH levels above about 10 present in said composition in an amount in the range of from about 0.05% to about 2.0% by weight of hydraulic cement in the composition, most preferably in an amount of from about 0.2% to about 1.0% by weight of hydraulic cement. The composition also preferably includes a crystalline silica to prevent strength retrogression.

In carrying out the method of the present invention, a high temperature set retarded well cement composition of the present invention is prepared by admixing in a suitable vessel the hydraulic cement, water, set retarder, fluid loss additive and any other additives utilized followed by the hydrophobing agent treated galactomannan gum utilized. The resulting set retarded cement composition is then pumped into a well bore or conduit disposed therein to a subterranean zone wherein the cement composition is to be placed. Upon the discontinuance of pumping, the composition rapidly develops static gel strength during the transition phase from a slurry to a hard mass followed by uniform development of compressive strength. In addition, when the temperature of the cement composition is increased to above about 120° F. during placement and after being placed, the hydration rate of the hydrophobing agent treated galactomannan gum increases which in turn increases the viscosity of the composition thereby offsetting the high temperature thinning of the slurry which would otherwise take place and preventing the settling of solids, the formation of free water, etc.

In order to facilitate a clear understanding of and to further illustrate the high temperature set retarded well cement compositions and methods of this invention, the following examples are provided. The test results presented in the examples as well as the components and procedures utilized are intended to be illustrative of the invention and not limiting thereto.

EXAMPLE 1

A typical prior art set retarded cement slurry having a density of 18 lb/gal was prepared containing the following components:

Class H Cement;
200 mesh Silica Flour present in an amount of 35% by weight of dry cement;
Hematite Weighting Material (HI-DENSE ® No. 3 commercially available from Halliburton Services of Duncan, Okla.) present in an amount of 35.5% by weight of dry cement;
Dispersant (sodium polynaphthalene sulfonate) present in an amount of 0.75% by weight of dry cement;
Set Retarder (lignosulfonate plus gluconic acid) present in an amount of 0.3% by weight of dry cement; and
Fresh Water present in an amount of 49.6% by weight of dry cement.

The cement slurry was prepared by dry blending the various components with the cement prior to the addition of water. Fresh water was mixed with the dry blend to form a slurry in a Waring blender. The rheology of the cement slurry was determined using a Fann viscometer. That is, the plastic viscosity and yield point were determined in accordance with the API Specification For Materials and Testing For Well Cements (Spec 10) 4th Edition, Aug. 1, 1988.

The initial plastic viscosity of the above described cement slurry was determined to be 132 and the calculated yield point was −12. the negative yield point of the slurry indicated an excessively dispersed or over-thinned slurry having a tendency to quickly settle and form free water.

The slurry was stirred in an atmospheric cement consistometer for 1 hour at 190° F., and the plastic viscosity and yield point were again determined. The plastic viscosity at 190° F. was 65 and the calculated yield point was −32. The complete settlement of solids was observed, and free water was measured in accordance with the above mentioned API specification to be 100 ml.

A set retarded cement slurry identical to the slurry described above except that borate treated hydroxypropylguar gum was combined with th slurry in an amount of 0.4% by weight of dry cement utilized in the slurry was next prepared. The initial plastic viscosity was 162 and the initial calculated yield point was a −12 as before. However, after 1 hour of stirring in the atmospheric cement consistometer at a temperature of 190° F., the measured plastic viscosity of the slurry was 91 and the measured yield point was 34. No solids settlement was observed, and the API free water test gave a value of 0.

Thus, the addition of the borate treated hydroxypropylguar gum to the cement slurry offset the high temperature thinning of the slurry, and prevented the slurry from settling, etc.

EXAMPLE 2

A series of tests were conducted to determine the effect of the combination of a set retarder comprised of a copolymer of AMPS and acrylic acid having a average molecular weight below about 5000 and comprised of about 50 mole percent AMPS, sodium tartrate and a hydration retarded borate treated hydroxypropylguar gum on cement slurry rheology, thickening time, fluid loss, and compressive strength. The cement slurries tested were prepared by dry blending all the constituents with the cement prior to the addition of water. Fresh water was then admixed with the dry constituents to form a slurry in a Waring blender. All of the tests were performed in accordance with the API procedures set forth in API Specification For Materials And Testing For Well Cements (Spec 10), 4th Edition, Aug. 1, 1988.

The tested cement slurries each included Capitol Class H cement, 35% silica flour by weight of cement, 42.0% hematite weighting material by weight of cement (HI-DENSE ® No. 3), 10.0% by weight of dry cement of a fluid loss additive (aqueous solution of ht reaction product of polyethyleneimine and one or more sulfonated organic compounds) 40.0% water by weight of dry cement.

In addition to the above components, the cement slurry for which test results are set forth in Table I below contained the following amounts (% by weight of dry cement) of set retarder, sodium tartrate and borate treated hydroxypropylguar gum (HPG):

| | |
|---|---|
| Set Retarder (50 mole % AMPS - acrylic acid copolymer) | 0.97% |
| Sodium Tartrate | 0.49% |
| Borate treated HPG | 0.24% |

The cement slurry for which test results are set forth in Table II below contained the following amounts (% by weight of dry cement) of set retarder, sodium tartrate and borate treated hydroxypropylguar gum (HPG):

| | |
|---|---|
| Set Retarder (50 mole % AMPS - acrylic acid copolymer): | 1.7% |
| Sodium Tartrate: | 0.86% |
| Borate treated HPG: | 0.44% |

TABLE I

Response Properties of 18.5 lb/gal Cement Slurry for Circulating Temperature of 292° F.

| Temp (°F.) | Atmospheric Consistometer | | VG Fann Data | | | | | | Free Water (% bv) | Settling |
|---|---|---|---|---|---|---|---|---|---|---|
| | Initial | 20 min | 300 rpm | 200 rpm | 100 rpm | 6 rpm | 3 rpm | 600 rpm | | |
| 80 | 5 | 9 | 130 | 86 | 44 | 8 | 4 | 250 | 4.0 | None |

TABLE I-continued

Response Properties of 18.5 lb/gal Cement Slurry for Circulating Temperature of 292° F.

| Temp (°F.) | Atmospheric Consistometer | | VG Fann Data | | | | | | Free Water | Settling |
|---|---|---|---|---|---|---|---|---|---|---|
| | Initial | 20 min | 300 rpm | 200 rpm | 100 rpm | 6 rpm | 3 rpm | 600 rpm | (% bv) | |
| 190 | 4 | 11 | 184 | 126 | 66 | 8 | 4 | 324 | 0 | None |
| 292 | — | — | 210 | 146 | 80 | 12 | 8 | 338 | 0 | None |

292° F. Fluid Loss: 11 cc/30 min
292° F. Thickening Time: 3:57
Compressive Strength at 350° F.: 24 Hr - 4330 psi
Compressive Strength at 290° F.: 24 Hr - 1870 psi

TABLE II

Response Properties of 18.5 lb/gal Cement Slurry for Circulating Temperature of 358° F.

| Temp (°F.) | Atmospheric Consistometer | | VG Fann Data | | | | | | Free Water | Settling |
|---|---|---|---|---|---|---|---|---|---|---|
| | Initial | 20 Min | 300 rpm | 200 rpm | 100 rpm | 6 rpm | 3 rpm | 600 rpm | (% bv) | |
| 80 | 10 | 10 | 196 | 136 | 70 | 8 | 6 | 330 | 1.0 | None |
| 190 | 9 | 19 | 380 | 288 | 178 | 24 | 16 | 580 | 0 | None |
| 358 | — | — | 382 | 286 | 176 | 28 | 20 | 600+ | 0 | None |

358° F. Fluid Loss: 32 cc/30 min
358° F. Thickening Time: 4:12
Compressive Strength at 400° F: 24 Hr - 3940 psi From Tables I and II it can be seen that the cement compositions of the present invention do not settle and form free water at high temperatures, and have rapid gel and compressive strength development.

EXAMPLE 3

A series of additional tests were conducted to determine the effect of temperature on a cement composition of he present invention, and to determine the effect of varying the concentrations of set retarder, sodium tartrate and borate treated HPG in cement compositions.

The cement slurries tested were prepared in the same manner as described in Example 2, and the slurry rheology and yield point tests were conducted in accordance with the API Specification for Materials and Testing For Well Cements (API Spec 10), 2nd Edition, June 15, 1984.

The cement slurry tested for which data is presented in Table III below had a density of 16.2 lb/gal. and was comprised of LaFarge Class H cement, 35% silica flour by weight of the dry cement used, 2.0% by weight of the dry cement used of a set retarder comprised of an aqueous solution of lignosulfonate and tartaric acid, 7.5% by weight of the dry cement used of a fluid loss reducing additive comprised of an aqueous solution of the reaction product of polyethyleneimine and one or more sulfonated organic compounds, 0.5% by weight of borate treated hydroxypropylguar gum, and 43.0% fresh water by weight of dry cement.

TABLE III

Effect of Temperature on Cement Slurry

| Temp (°F.) | Fann Data | | | | Yield Point (lb/100 ft²) |
|---|---|---|---|---|---|
| | 600 rpm | 300 rpm | 200 rpm | 100 rpm | |
| 80 | 396 | 234 | 148 | 78 | 72 |
| 100 | 380 | 214 | 150 | 80 | 48 |
| 120 | 584 | 332 | 240 | 132 | 80 |
| 140 | 406 | 234 | 170 | 96 | 62 |
| 160 | 236 | 140 | 108 | 64 | 44 |
| 190 | 244 | 148 | 110 | 62 | 52 |

The cement slurries tested for which data is presented in Table IV below each had a density of 16.2 lb/gal and contained, in addition to the amounts of borate treated HPG given in Table IV, Capitol Class H cement, 35% silica flour by weight of dry cement used, 1% by weight of dry cement of a set retarder comprised of lignosulfonate and tartaric acid, 7.5% by weight of dry cement of a fluid loss reducing additive comprised of an aqueous solution of he reaction product of polyethyleneimine and one or more sulfonated organic compounds and 44.0% fresh water by weight of dry cement.

TABLE IV

Effect of Borated HPG Concentration on Slurry Rheology

| Borated Hydroxypropylguar, % by wt. of cement | 80° F. Fann Data | | | | | 190° F. Fann Data | | | | |
|---|---|---|---|---|---|---|---|---|---|---|
| | 600 rpm | 300 rpm | 200 rpm | 100 rpm | Yield Point (lb/100 ft²) | 600 rpm | 300 rpm | 200 rpm | 100 rpm | Yield Point (lb/100 ft²) |
| 0 | 93 | 41 | 29 | 14 | Negative | 34 | 10 | 5 | 4 | Negative |
| 0.25 | 92 | 44 | 28 | 14 | Negative | 54 | 22 | 14 | 8 | Negative |
| 0.5 | 116 | 52 | 34 | 18 | Negative | 90 | 42 | 30 | 16 | Negative |
| 0.75 | 140 | 66 | 46 | 24 | Negative | 170 | 98 | 74 | 42 | 16 |
| 1.0 | 154 | 82 | 62 | 34 | 10 | 278 | 184 | 142 | 82 | 90 |

The data of Tables III and IV clearly illustrates the operability of the present invention in preventing cement slurry high temperature thinning and separation.

Thus, the present invention is well adapted to attain the ends and advantages mentioned as well as those which are inherent therein. While numerous variations and modifications may be made to the compositions and

What is claimed is:

1. A st retarded cement composition which is substantially non-thinning at high temperatures comprising:
   hydraulic cement;
   sufficient water to form a pumpable slurry;
   a set retarder comprising at least one member selected from the group consisting of a copolymer of 2-acrylamido, 2-methylpropane sulfonic acid (AMPS) and acrylic acid having an average molecular weight below about 5000 and comprising from about 40 to about 60 mole percent AMPS, said copolymer being present in an amount in the range of from about 0.1 to about 5% by weight of cement, lignosulfonates present in an amount in the range of from about 0.1 to about 5% by weight of cement, borates present in an amount in the range of from about 0.2 to about 5% by weight of cement and organic acids present in an amount of from about 0.2 to about 5% by weight of cement; and
   a galactomannan gum which has been treated with a hydrophobing agent selected from the group consisting of potassium pyroantimonate present on the gum in an amount of from about 0.001 to about 0.3 percent by weight of the gum and compounds capable of liberating borate ions when added to water present on the gum in an amount of from about 0.5 to about 1.0 percent by weight of the gum.
whereby the hydration rate of said gum is retarded at temperatures below about 120 degrees F. and at pH levels above about 10, but the hydration rate increases at temperatures above about 120 degrees F., said treated gum being present in said composition in an amount of at least about 0.5% by weight of cement.

2. The composition of claim 1 wherein said galactomannan gum is selected from the group consisting of guar gum, hydroxypropylguar gum, hydroxyethylguar gum, carboxymethylhydroxypropylguar gum and carboxyethylhydroxypropylguar gum.

3. The composition of claim 1 wherein said treated galactomannan gum is present in said composition in an amount in the range of from about 0.05% to about 2.0% by weight of hydraulic cement in said composition.

4. The composition of claim 1 wherein said treated galactomannan gum is borate treated hydroxypropylguar gum present in said composition in an amount in the range of from about 0.2% to about 1.0% by weight of hydraulic cement in said composition.

5. The composition of claim 1 wherein said set retarder is comprised of a copolymer of 2-acrylamido, 2-methylprpane sulfonic acid (AMPS) and acrylic acid having an average molecular weight below about 5000 and comprising from about 40 to about 60 mole percent AMPS, said set retarder being present in said composition in an amount in the range of from about 0.1% to about 5.0% by weight of hydraulic cement in said composition.

6. The composition of claim 5 defined further to include tartaric acid or a salt thereof present in an amount in the range of from about 0.1% to about 5.0% by weight of hydraulic cement in said composition.

7. The composition of claim 1 defined further to include at least one fluid loss additive therein present in an amount of from about 2.5 to about 10% by weight of cement.

8. The composition of claim 7 wherein said fluid loss additive is an aqueous solution of the reaction product of polyethyleneimine and one or more sulfonated organic compounds.

9. The composition of claim 1 wherein said set retarder is comprised of a copolymer of 2-acrylamido, 2-methylpropane sulfonic acid (AMPS) and acrylic acid having an average molecular weight below about 5000 and comprising from about 40 to about 60 mole percent AMPS present in an amount in the range of from about 0.5% to about 2.0% by weight of hydraulic cement in said composition and sodium tartrate present in an amount in the range of from about 0.25% to about 2.0% by weight of hydraulic cement in said composition; and said treated galactomannan gum is borate treated hydroxypropylguar gum present in an amount in the range of from about 0.2% to about 1.0% by weight of hydraulic cement in said composition.

10. The composition of claim 9 defined further to include a fluid loss additive comprised of an aqueous solution of the reaction product of polyethyleneimine and one or more sulfonated organic compounds present in said composition in an amount in the range of from about 4.0% to about 7.0% by weight of hydraulic cement in said composition.

11. A method of cementing a subterranean zone penetrated by a well bore comprising the steps of:
   forming a pumpable set retarded cement slurry comprising hydraulic cement, water present in an amount sufficient to form a pumpable slurry, a set retarder comprising at lest one member selected from the group consisting of a copolymer of 2-acrylamido, 2-methylpropane sulfonic acid (AMPS) and acrylic acid having an average molecular weight below about 5000 and comprising from about 40 to about 60 mole percent AMPS, said copolymer being present in an amount in the range of from about 0.1 to about 5% by weight of cement, lignosulfonates present in an amount in the range of from about 0.1 to about 5% by weight of cement, borates present in an amount in the range f from about 0.2 to about 5% by weight of cement and organic acids present in an amount of from about 0.2 to about 5% by weight of cement, and a galactomannan gum which has been treated with a hydrophobing agent selected from the group consisting of potassium pyroantimonate present on the gum in an amount of from about 0.001 to about 0.3 percent by weight of the gum and compounds capable of liberating borate ions when added to water present on the gum in an amount of from about 0.5 to about 1.0 percent by weight of the gum whereby the hydration rate of said gum is retarded at temperatures below about 120 degrees F and at pH levels above about 10, but the hydration rate increases at temperatures above about 120 degrees F., said treated gum being present in said composition in an amount of at least about 0.05% by weight of cement;
   pumping said cement slurry into said zone by way of said well bore; and
   allowing said cement slurry to set therein.

12. The method of claim 11 wherein said galactomannan gum is selected from the group consisting of guar gum, hydroxypropylguar gum, hydroxyethylguar gum, carboxymethylhydroxypropylguar gum and carboxyethylhydroxypropylguar gum.

13. The method of claim 11 wherein said treated galactomannan gum is present in said cement slurry in an amount in the range of from about 0.05% to about 2.0% by weight of hydraulic cement in said slurry.

14. The method of claim 11 wherein said treated galactomannan gum is borate treated hydroxypropylguar gum present in said cement slurry in an amount in the range of from about 0.2% to about 1.0% by weight of hydraulic cement in said slurry.

15. The method of claim 11 wherein said set retarder is comprised of the copolymer of 2-acrylamido, 2-methylpropane sulfonic acid (AMPS) and acrylic acid.

16. The method of claim 15 defined further to include tartaric acid or a salt thereof present in an amount in the range of from about 0.1% to about 5.0% by weight of hydraulic cement in said slurry.

17. The method of claim 11 which is further characterized to include at least one fluid loss additive in said cement slurry.

18. The method of claim 17 wherein said fluid loss additive is an aqueous solution of the reaction product of polyethyleneimine and one or more sulfonated organic compounds present in said slurry in an amount in the range of from about 2.5% to about 10.0% by weight of hydraulic cement in said slurry.

* * * * *